April 15, 1958   J C SHUPTRINE   2,830,620
VALVE
Filed May 9, 1955   2 Sheets-Sheet 1
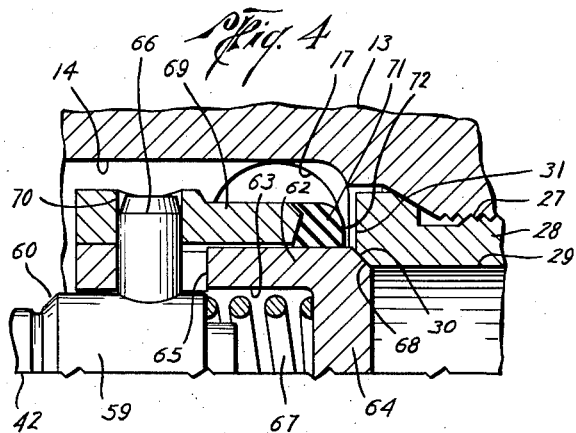
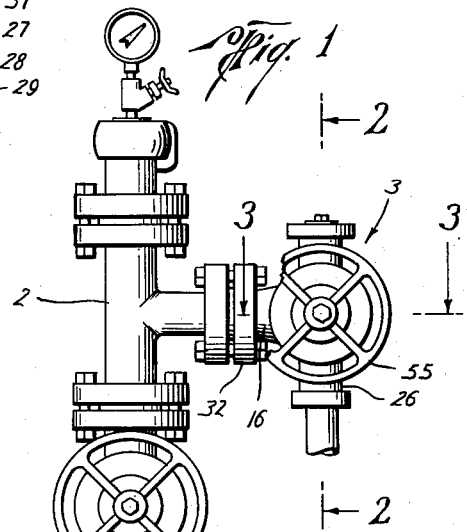
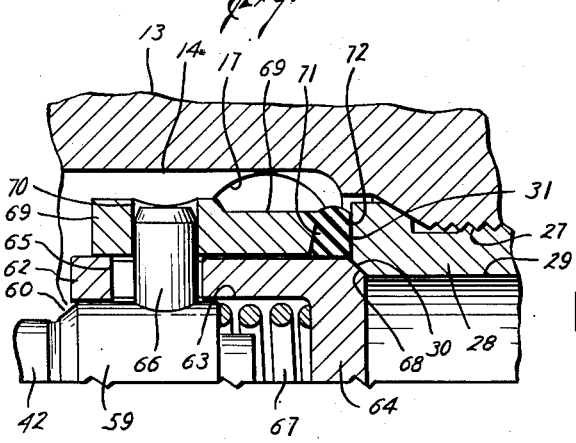
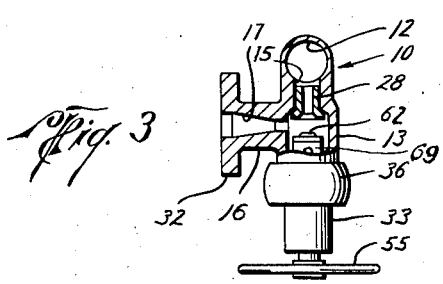
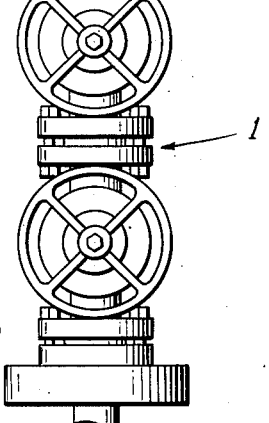
J C Shuptrine
INVENTOR.
BY
ATTORNEY April 15, 1958 — J C SHUPTRINE — 2,830,620
VALVE
Filed May 9, 1955 — 2 Sheets-Sheet 2

J C Shuptrine
INVENTOR.

BY
ATTORNEY

United States Patent Office 2,830,620
Patented Apr. 15, 1958

2,830,620

VALVE

J C Shuptrine, Houston, Tex., assignor to Texas Tool & Machine Co., Houston, Tex., a corporation of Texas Application May 9, 1955, Serial No. 506,920

2 Claims. (Cl. 137—630.19)

This invention relates to a valve and more particularly a valve employing a compound closure including a secondary sealing means as well as a primary sealing means, and in which the secondary sealing means coacts with the primary sealing means to positively insure a fluid tight seal.

It is an object of the invention to provide a valve which is capable of maintaining an effective seal for the flow passage of a valve when sealing against high fluid pressures, and when subjected to the action of erosive fluids.

Another object of the invention is to provide a valve having compound closure means comprising a primary metal-to-metal sealing means and a secondary sealing means formed of resilient non-metallic material or soft non-ferrous metal, and which is capable of effecting a fluid tight seal after the metal-to-metal seating surfaces of the primary sealing means have deteriorated due to erosion or other cause.

Another object of the invention is to provide a valve of the type described in which the secondary sealing means has a seat-engaging surface which is formed of resilient material surrounding a primary metal-to-metal sealing means whereby the resilient material of the secondary sealing means will provide closure means resistant to erosion, flow or extrusion due to the high velocity of the fluids in the final closing and initial opening movements of the closure means.

A still further object of the invention is to provide a valve of the type described in which the primary and secondary sealing means are adapted to be seated separately and successively in response to the longitudinal movement of the valve stem, whereby the torque required to open the valve is substantially reduced.

A further object is to provide a valve having a flow port providing communication between inlet and outlet flow passages through the valve and having a closure means for the port which comprises a primary metal-to-metal seal means and a secondary resilient material seal means for supplementing the sealing action of the primary seal means.

An additional object is to provide a valve, such as an angle or globe valve, having inlet and outlet passages off-set with respect to each other and a flow port providing communication between the passages, a compound closure member for the flow port, said closure member including a primary metallic closure element and a secondary resilient non-metallic closure element concentrically engageable with a seating surface surrounding the flow port, said closure elements being mounted for relative axial movement.

Another object of the invention is to provide a valve of the type described which has a full opening through the valve.

Another object of the invention is to provide a valve of the type described which is peculiarly adapted for use as a flow control valve in a Christmas tree assembly of the type commonly used in conjunction with producing oil and gas wells.

The invention will be readily understood by referring to the following description and the accompanying drawing, in which:

Fig. 1 is a side elevational view of a Christmas tree of the type used in conjunction with producing wells, and having incorporated therein a valve embodying the invention.

Fig. 3 is a sectional view taken along line 3—3 of Fig. 1;

Fig. 4 is a fragmentary view, on an enlarged scale, of a portion of the apparatus illustrated in Fig. 2, showing the valve closure in one of two closed positions in which only the primary sealing means is seated.

Fig. 5 is a view similar to Fig. 4, showing the valve closure in another of its closed positions in which both the primary sealing means and the secondary sealing means are seated.

Figure 2:
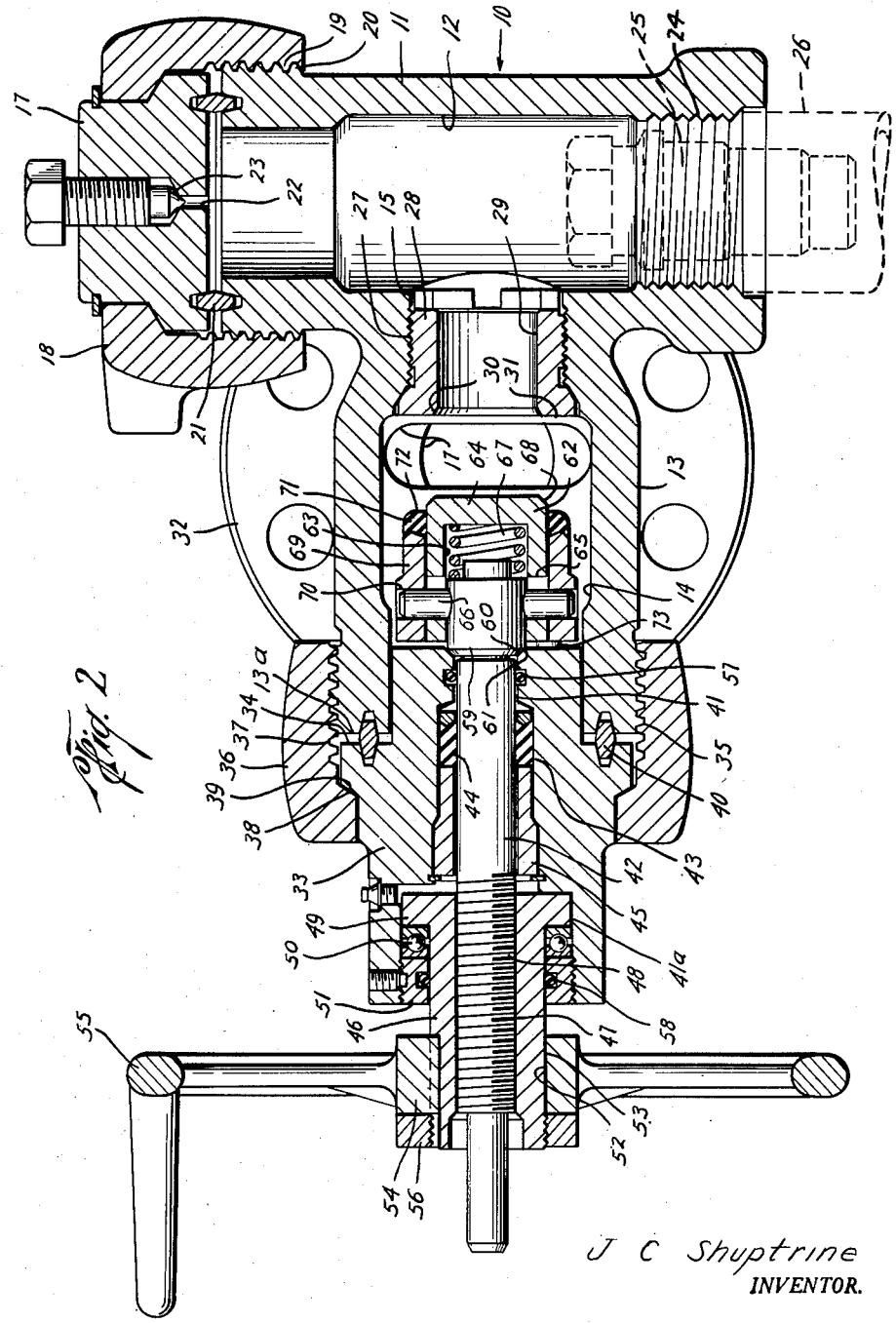
Fig. 2 is a sectional elevational view taken on the line 2—2 of Fig. 1, and showing the valve in its open position.

Referring to Fig. 1 of the drawing, a Christmas tree, which is designated generally by the numeral 1 and which may be of the usual construction, includes a T 2 whereby a valve embodying the invention, which is indicated generally by the numeral 3, may be connected to one side thereof.

Referring to Figs. 2 to 5, the valve, in accordance with one illustrative embodiment of the invention, includes a hollow body, designated generally by the numeral 10, of a generally T-shape including a generally tubular flow portion 11, having an axial bore 12 and intersected intermediate its ends by a tubular extension 13 having an enlarged bore 14 which communicates with bore 12 through a reduced diameter passage 15. Extension 13 is, in turn, intersected intermediate its ends by a second tubular flow portion 16 (Figs. 1 and 3) having a bore 17 communicating with bore 14. The axes of the flow portions 11 and 16 are thus angularly oriented with respect to each other, and the bores of the flow portions communicate with each other through passage 15. It will be understood that either of the flow portions 11 and 16 may be the inlet passage, the other being the outlet passage for the valve.

One end of flow portion 11 may be closed by any suitable closure means exemplified by a plug 17 which is secured over the end of the portion by means of a suitably shaped clamping collar 18 which is internally threaded at 19 to engage external threads 20 on the flow portion to draw the plug down tightly against the end of the flow portion. A sealing ring gasket 21 of conventional form may be positioned between the abutting surfaces of the plug and the end face of flow portion 11. Plug 17 may be provided with a vent passage 22 controlled by a needle valve 23 threadedly mounted in the plug for reciprocation relative to vent passage 22. The opposite end of flow portion 11 may be internally threaded, as at 24, or provided with any other conventional type of connection element for connection of this flow portion of the valve into a conduit system. By way of example, a choke assembly comprising a flow bean 25 and cage nipple 26 is shown in broken lines connected into the end of flow portion 11.

Connecting passage 15 is internally threaded at 27 to threadedly receive an externally threaded tubular seat nipple 28 having an axial port 29 therethrough. The end of seat nipple 28 which is presented to bore 14 includes concentric inner and outer annular seats 30 and 31, respectively. Inner seat 30, which is formed about the outer end of port 29 is bevelled, or tapered, while outer seat 31 is substantially flat.

Flow portion 16 is provided at its outer end with a conventional bolt flange 32 for connecting the valve into a conduit system such as the Christmas tree 1. It will be understood that any other known type of connection element may be employed in lieu of flange 32.

The outer end of extension 13 is closed by means of a bonnet assembly including the tubular bonnet plug 33 insertable into the end of enlarged bore 14 and provided with an external annular shoulder 34 positioned to engage the outer end face 13a of extension 13. The outer end portion of extension 13 is externally threaded at 35 to receive a bonnet ring 36 internally threaded at 37 and having an internal shoulder 38 near its outer end adapted to engage an upwardly facing external shoulder 39 on bonnet plug 33. When ring 36 is screwed down over threads 35, the bonnet plug will be drawn down toward end face 13a of extension 13. A seal ring gasket 40 is disposed between shoulder 34 and the end face 13a to form a fluid-tight seal therebetween.

Bonnet plug 33 is provided with an axial bore 41 adapted to receive the valve stem 42. Bore 41 is enlarged at 43 intermediate its ends to form a stuffing box in which seal packing 44 is disposed about the stem and compressed by the gland 45. The outer end of bore 41 is further enlarged at 41a to receive the stem drive nut 46 which is internally threaded at 47 to threadedly engage threads 48 provided on stem 42. The inner end of drive nut 46 has an external flange 49 on which is seated an anti-friction bearing 50 which is backed up by a lock ring 51 surrounding drive nut 46 and threadedly inserted into the outer end of enlargement 41a. The outer end of drive nut 46 is provided at 52 with non-round surfaces adapted to be non-rotatively received in the correspondingly shaped bore 53 of the hub 54 of an operating wheel 55 which is locked on the end of the drive nut by means of a lock nut 56. A seal ring 57 is positioned about stem 42 to seal with bore 41. A second seal ring 58 is positioned in the bore of lock ring 51 to seal about the exterior of the drive nut.

The inner end of stem 42 is provided with an enlarged head 59 of generally cylindrical form and is provided on its outer end with a bevelled surface 60 adapted to seat in a complementary tapered annular seat 61 formed about the inner end of bore 41. When stem 42 is retracted sufficiently surface 60 will engage seat 61 and form a seal therewith to prevent leakage of fluid from the interior of the body through bore 41.

A tubular closure plug 62 having the axial bore 63 closed at its forward end by the end wall 64 is mounted over the end of head 59 for axial movement relative thereto. The wall of plug 62 is provided on diametrically opposite sides thereof with longitudinally elongated slots 65—65 having closed ends. Stop pins 66—66 which project radially from head 59 extend into and through slots 65—65 and cooperate with the ends of the slots to limit the extent of relative longitudinal movement between closure plug 62 and stem 42. The engagement of stop pins 66 with the walls of slots 65 also prevents relative rotation between these parts. A coil spring 67 is mounted in bore 63 of the closure plug in compression between the end of head 59 and the inner face of end wall 64. The latter is provided about its outer peripheral edge with a bevelled surface 68 which is adapted to seat in seat 30. Closure plug 62 is preferably constructed of metal as is seat nipple 28 and closure plug 62 coacting with seat 30 constitutes the primary metal-to-metal seal for the valve closure.

A tubular sleeve 69 surrounds the exterior of closure plug 62 having a free sliding fit thereon. Sleeve 69 has diametrically opposed radial openings 70—70 adapted to receive the outer ends of stop pins 66 in close fitting engagement whereby sleeve 69 is effectively secured against longitudinal movement relative to stem 42 and head 59. Sleeve 69 is made somewhat shorter than closure plug 62 and the forward end of sleeve 69 has fixedly secured thereto in any suitable manner a seal ring 71 constructed of flexible resilient composition, such as rubber or one of the artificial rubber-like compositions, and dimensioned to have a snug sliding fit about the exterior of closure plug 62. The overall length of sleeve 69 and ring 71 is such that the forward end face 72 of the seal ring will normally be disposed slightly rearwardly of the forward end of closure plug 62. Seal ring 71 is adapted to cooperate with annular seat 31 on seat nipple 28 to form the previously mentioned resilient secondary seal for the valve closure, functioning in the manner to be described more fully hereinafter.

A dowel pin 73 extends between the adjacent ends of bonnet plug 33 and closure plug 62 to prevent rotation of the closure elements in the valve body.

Operation of the valve is as follows: When the valve is in open position, as shown in Fig. 2, the forward end of closure plug 62 extends forwardly beyond the forward extremity of seal ring 71. Thus, as stem 42 is moved inwardly of the valve body, bevelled surface 68 on closure plug 62 will first be seated in inner seat 30 on seat nipple 28, as best shown in Fig. 4, to form the primary metal-to-metal seal between the closure plug 62 and the seat nipple. Upon further inward movement of stem 42, spring 67 will be compressed and sleeve 69 will be moved forwardly by the further stem movement, sliding over closure plug 62 until end face 72 of seal ring 71 engages outer seat 31 on the end of seat nipple 28, as best seen in Fig. 5. The continued forward movement of the stem compresses seal ring 71 tightly about the exterior of closure plug 62 as well as against outer seat 31. Seal ring 71 will thus form a flexible resilient seal between closure plug 62 and the seat nipple, concentrically enclosing the sealing area embodied in the primary metal-to-metal seal between the closure plug and the seat nipple. The pressure exerted by the stem through sleeve 69 against seal ring 71 deforms the latter sufficiently to accommodate the flexible seal to any imperfections in the several surfaces engaged thereby and to fill the interstices between the metal-to-metal sealing surfaces. Should any erosion or corrosion of the metal-to-metal surfaces occur which might cause leakage when the valve is closed, the secondary seal provided in accordance with this invention will effectively prevent such leakage.

When stem 42 is retracted to open the valve, sleeve 69 and seal ring 71 will first be retracted while closure plug 62 will remain seated under the urging of spring 67. As soon as the stem has been retracted sufficiently to bring pins 66 against the outer ends of slots 65, closure plug 62 will be withdrawn from the seat nipple, thereby completing the opening of the valve.

It will be evident that the duplex sealing structure provided in accordance with this invention will have application in many forms of valves, such as globe, angle and needle valves, and will be particularly useful for service involving erosive and corrosive fluids.

Although the illustrative embodiment shows a valve of the rising stem type, it will be evident that the invention may also be readily applied to valves of the non-rising stem type.

It will also be understood that numerous other alterations an modifications may be made in the details of the illustrative embodiment within the scope of the appended claims without departing from the spirit of this invention.

What I claim and desire to secure by Letters Patent is:

1. A valve, comprising, a body having inlet and outlet passages, a port providing communication between said passages and having an annular seat therein, a stem reciprocable in the body relative to the seat, and a compound closure member mounted on the stem for movement thereby into and out of engagement with said seat, said closure member comprising relatively slidable inner and outer concentric annular sealing elements, the outer one of said sealing elements comprising a sleeve open at both ends and fixedly secured to the stem, and the inner one of said sealing elements being constructed of metal and resiliently connected to said stem to have limited longitudinal movement relative to the stem and to the outer one of said sealing elements and to normally project forwardly of the forward end of the outer sealing element, whereby the inner sealing element will engage said seat in advance of the outer sealing element in response to movement of the stem toward said seat, the seat-engaging portion of the outer sealing element being constructed of flexible resilient non-metallic material and disposed to seal the juncture between said inner sealing element and said seat when moved into engagement with said seat.

2. A Christmas tree valve for wellheads, comprising, a hollow body of integral one-piece construction including a first tubular flow portion, a tubular extension intersecting said first flow portion intermediate its ends whereby to define a substantially T-shaped body, a second tubular flow portion intersecting said extension intermediate its ends and substantially normal thereto, said flow portions having communicating bores forming a flow passage through said body, an annular valve seat in said passage co-axial with the bore of said extension, a stem axially reciprocable in said extension relative to the seat, and a compound closure member mounted on the stem for movement thereby into and out of engagement with said seat, said closure member comprising inner and outer concentric annular sealing elements, the outer one of said sealing elements comprising a sleeve open at both ends and fixedly secured to the stem, and the inner one of said sealing elements being resiliently connected to said stem to have limited longitudinal movement relative to the stem and to the outer one of said sealing elements and to normally project forwardly of the forward end of the outer sealing element, whereby the inner sealing element will engage said seat in advance of the outer sealing element in response to movement of the stem toward said seat, the seat-engaging portion of said outer sealing element being constructed of flexible resilient non-metallic material and positioned when moved into engagement with said seat to seal the juncture between said inner sealing element and said seat.

References Cited in the file of this patent

UNITED STATES PATENTS

| | | |
|---|---|---|
| 208,986 | Patterson | Oct. 15, 1878 |
| 1,705,800 | Akeyson | Mar. 19, 1929 |
| 1,710,006 | Peter | Apr. 23, 1929 |
| 1,779,266 | Mobley | Oct. 21, 1930 |
| 1,781,224 | Gilg | Nov. 11, 1930 |
| 2,006,191 | Anderson | June 25, 1935 |
| 2,079,647 | Abegg | May 11, 1937 |
| 2,295,611 | Smith | Sept. 15, 1942 |
| 2,413,869 | Hamer | Jan. 7, 1947 |
| 2,595,012 | Smith | Apr. 29, 1952 |
| 2,659,565 | Johnson | Nov. 17, 1953 |
| 2,676,781 | Hobbs | Apr. 27, 1954 |
| 2,694,545 | Steenbergh | Nov. 16, 1954 |

FOREIGN PATENTS

| | | |
|---|---|---|
| 17,847 | Great Britain | of 1896 |